United States Patent [19]

Batistoni

[11] 4,411,177

[45] Oct. 25, 1983

[54] NUMERICAL CONTROL SURFACING PLATE

[75] Inventor: Michel Batistoni, Dracy le Fort, France

[73] Assignee: Frammatone, Courbevoie, France

[21] Appl. No.: 242,763

[22] Filed: Mar. 11, 1981

[30] Foreign Application Priority Data

Mar. 14, 1980 [FR] France ............................... 80 05835

[51] Int. Cl.³ ............................................. B23B 3/12
[52] U.S. Cl. ........................................ 82/2 E; 409/146
[58] Field of Search ................... 82/1.2, 2 E, 1 C; 409/146; 74/409; 408/1

[56] References Cited

U.S. PATENT DOCUMENTS

| | | | |
|---|---|---|---|
| 1,962,951 | 6/1934 | Conwell | 82/2 E X |
| 2,127,792 | 8/1938 | Swift et al. | 82/2 E |
| 2,404,433 | 7/1946 | Christman | 82/2 E X |
| 2,486,977 | 11/1949 | Peters | 82/2 E |
| 2,548,603 | 4/1951 | Hallstrand | 74/409 |
| 3,113,475 | 12/1963 | Lombardo | 82/2 E X |
| 3,311,003 | 3/1967 | Daugherty | 82/1.2 |

FOREIGN PATENT DOCUMENTS 53-69993  6/1978  Japan .................................. 82/1.2

Primary Examiner—Z. R. Bilinsky
Attorney, Agent, or Firm—Pollock, Vande Sande & Priddy

[57] ABSTRACT

A surfacing plate for a boring and milling machine comprising a hollow cylindrical body provided with a rear end fixed to the milling spindle and a head on which a radial guide is formed for a tool holder slide. The movement of the slide is controlled by the boring spindle through a control unit located inside the body and comprising a central part sliding longitudinally in the body under the action of the spindle and having two longitudinal racks. The slide bears two radial racks connected respectively to the two longitudinal racks through two independant transmission trains, and is provided with means for adjusting the relative radial position of the two radial racks for taking up the play in the transmission.

4 Claims, 3 Drawing Figures

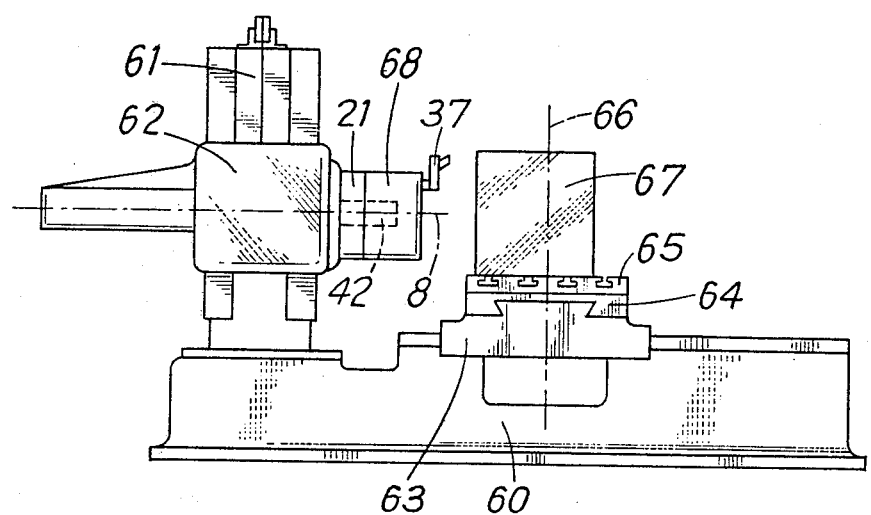

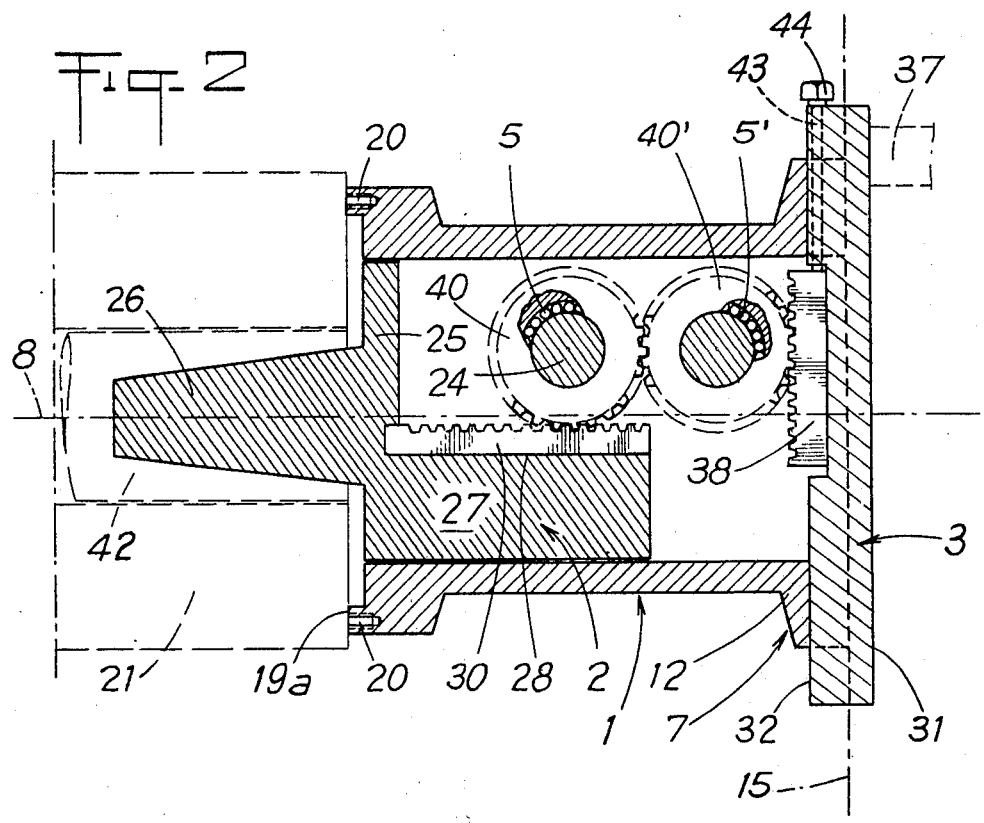
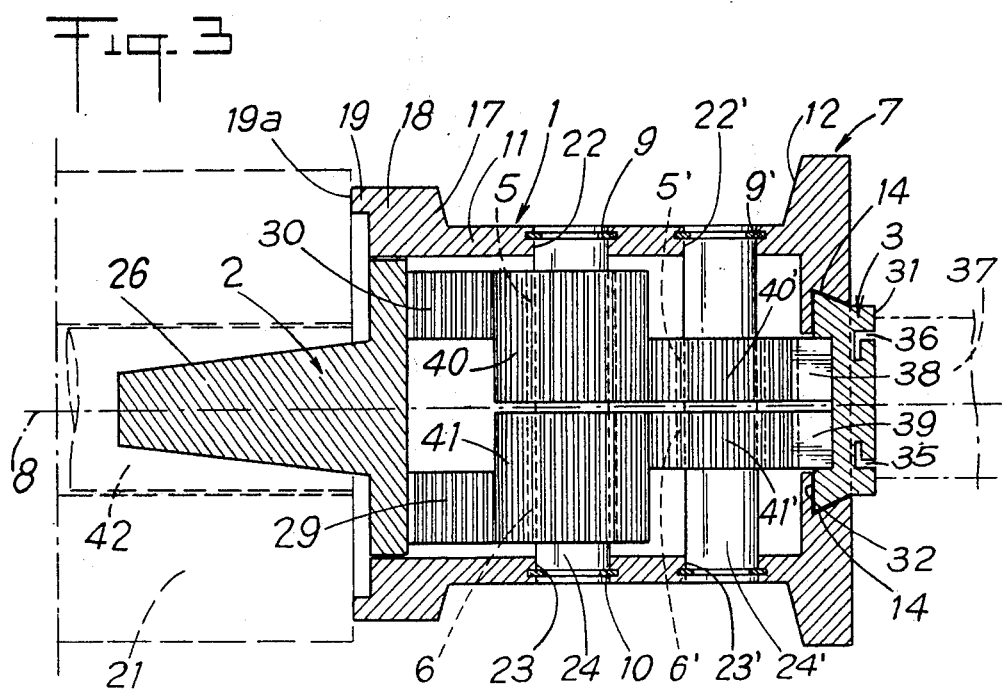

NUMERICAL CONTROL SURFACING PLATE

SUMMARY OF THE INVENTION

The invention relates to a surfacing plate for fastening to the milling spindle of a boring and milling machine comprising a boring spindle rotatable and slidable longitudinally in the milling spindle, this boring and milling machine having a numerical control for servo-coupling the longitudinal movement of the boring spindle in the milling spindle, on the one hand, and for servo-coupling the relative longitudinal movement of the surfacing plate with respect to the table, on the other hand, this surfacing plate being of the type comprising a radial guide on which a tool holder slide is mounted for radial movement controlled by a servo-coupling system.

BACKGROUND OF THE INVENTION

Numerically-controlled boring and milling machines are used in particular for forming variable profiles of revolution connected by curved sections.

Surfacing plates of the aforesaid type are already known, where the radial movement of the slide is controlled by a servo-coupling independent of the other axial movements of the machine. This technique necessitates a complex kinematic mechanism of the differential type, and use of an additional motor for the spindle or for the radial slide. In addition, this technique employs complex trains of pinions, or electrical connections difficult to construct and of uncertain reliability. The distribution of the rotary masses often is scarcely satisfactory and does not permit a high rotary speed to be achieved. In addition, the plays are difficult to take up.

It has also been proposed, for example in U.S. Pat. No. 2,404,433 to servo-couple the radial movement of the tool holder slide to the longitudinal movement of the boring spindle.

More precisely, this purpose is achieved by the construction of a surfacing plate comprising a hollow cylindrical body the rear end of which is fixed to the milling spindle of the machine tool and the front end of which carries the tool holder slide.

The servo-coupling mechanism comprises a central part coupled longitudinally on the side of the rear end of the cylindrical body, by a conical end piece to the boring spindle, slidable longitudinally inside the cylindrical hollow body and provided with a longitudinal rack connected kinematically by a set of pinions with a radial rack screwed onto the inner surface of the tool holder slide, situated in a plane perpendicular to the plane of the longitudinal racks of the central part and arranged so that the longitudinal movement of the boring spindle in the milling spindle is converted by the longitudinal racks of the central part, the set of pinions and the radial rack of the slide, into a radial movement of the slide.

Other more or less complex arrangements have been proposed. However, none enables the taking up of the play in the mechanical transmission by simple means, which is however necessary in order that the radial movement of the slide may follow the longitudinal movement of the boring spindle with precision.

OBJECT OF THE INVENTION

It is an object of the present invention to provide an arrangement enabling the taking up of play in both directions without substantially increasing the complexity of the mechanism.

Other objects and advantages of the surfacing plate according to the invention will be apparent from the description which follows.

GENERAL DESCRIPTION OF THE INVENTION

According to the invention, there is provided a surfacing plate of the type concerned, the central part being provided with two longitudinal racks, the tool holder slide itself being fast to two radial racks connected respectively to two longitudinal racks through two independent transmission trains, the slide being provided with means for adjusting the relative radial position of the two radial racks for taking up the plays in the kinematic transmission.

In a preferred embodiment, the two longitudinal racks, the two radial racks and the two transmission trains are placed symmetrically on both sides of the axial plane of symmetry of the slide so that the center of inertia of the whole is located on the longitudinal axis of rotation and each transmission train is constituted by two pinions meshing, on the one hand, in one another, and on the other hand, one in the corresponding longitudinal rack, the other in the radial rack, said pinions being loose-mounted in pairs on two axes perpendicular to the plane of symmetry and supported by the cylindrical body.

BRIEF INTRODUCTION OF THE DRAWINGS

The invention will be better understood from the description which follows with reference to the accompanying drawings, in which:

FIG. 1 is a front elevation of a boring and milling machine equipped with a surfacing plate according to the invention;

FIG. 2 is a section of a surfacing plate according to the invention in a plane passing through the longitudinal rotary axis and radial axis of the movement of the slide; and FIG. 3 is a section of a surfacing plate according to the invention in a plane passing through the longitudinal rotary axis and perpendicular to the radial axis of movement of the slide.

DESCRIPTION OF A PREFERRED EMBODIMENT

In the drawings, FIG. 1 shows diagrammatically a type of numerically controlled boring and milling machine, constituted essentially by a bench 60 carrying a fixed upright 61 on which a spindle holder carriage 62 held by a counterweight (not shown) is movable vertically by means of a chain 63. The carriage 62 bears a boring spindle 42 and a milling spindle 21 concentric and rotating around the longitudinal horizontal axis of rotation 8. In addition, the boring spindle 42 can be moved longitudinally along the axis 8 inside the milling spindle 21.

The boring and milling machine also includes, on the bench 60, a slide 63 which can be moved longitudinally along the bench 60 parallel with the axis 8, on which a transverse slide 64 is mounted movable horizontally and transversely to the axis 8; on the latter is mounted the orientable table 65 which can turn around the vertical axis 66.

The workpiece 67 is fixed to the table 65 and is machined by a tool 37 mounted on the surfacing plate 68 itself fixed to the milling spindle 21.

The relative longitudinal spacing between the surfacing plate and the table can be effected either by a longitudinal movement of the table by means of the slide 63, or on certain machines having a slider by a longitudinal movement of the surfacing plate along the axis 8.

The movements of the machine tool are servo-coupled, in particular the relative longitudinal movement of the surfacing plate with respect to the table and the longitudinal movement of the boring spindle 42 in the milling spindle 21.

While a boring and milling machine with a fixed upright is being described the invention relates to a surfacing plate which can be fixed to other types of boring and milling machines.

The surfacing plate essentially comprises a hollow cylindrical body 1, for example of cast iron, within which a central part 2 is slidable, for example of steel, connected by pinions 40, 41, 40', 41' and racks 29, 30, 38, 39 to the slide 3, for example of steel, bearing the tool 37.

The cylindrical hollow body 1 comprises a middle tubular section 11 widening on one side through a connecting section 12, so as to give the head 7 of the surfacing plate a substantially square cross-section.

On the other side of the body 1, i.e., on the side of the upright of the machine tool, the tubular middle part 11 widens through a frustoconic section 17 so as to form a short thick tubular portion 18 of the same inner diameter and of outer diameter greater than those respectively of the tubular middle portion 11. This thick tubular portion 18 is succeeded by a rim 19, also tubular, of the same outer diameter and of an inner diameter greater than those respectively of portions 11 and 18. The outer suface 19a of the rim 19 comprises threaded holes 20 to assure the fastening by screws of this rim to the milling spindle 21. The cylindrical body 1 may thus be rotated around the longitudinal axis 8 by the milling spindle 21.

The square head 7 is machined along one of its medians to form a dovetail guide 14 for the slide 3. The slide 3 slides by means of this guide 14 along the radial axis 15, perpendicular to the longitudinal axis of rotation 8.

The cylindrical body 1 includes, on the other hand, two pairs of bores, 22 and 23 which can receive a transverse axle 24; 22' and 23' which can receive a transverse axle 24'. These axles 24 and 24' are perpendicular to the longitudinal axle 8 and to the radial axis 15.

Inside the hollow cylindrical body 1 and along the longitudinal axis 8 can slide central part 2, including a disk 25 of diameter sufficiently less than the inner diameter of the hollow cylindrical body to provide sliding clearance.

The rear side of the disk 25 facing the boring spindle 42 carries a conical end piece 26 directed along the longitudinal axis 8 and enabling it to be connected longitudinally to the boring spindle 42.

The front side of the disk 25 carries a sliding carriage 27 the contour of which is in part cylindrical, to permit longitudinal sliding movement on the inner surface of the cylindrical body 1, and in part flat. On the flat part 28, perpendicular to the radial axis 15 of the guide 14, are screwed longitudinally two racks 29 and 30 parallel to the longitudinal axis 8.

The end positions of the sliding central part 2 are determined, at one end, when the front of the sliding carriage 27 comes into abutment against the slide 3, and at the other end, by the retracted position of the boring spindle 42. The length of travel of the part 2 determines the minimum length to be given to the longitudinal racks 29 and 30.

The slide 3 is approximately parallelepedic and slidable in the guide 14 by means of a dovetailed assembly. The slide 3 bears on its outer surface 31, radial grooves 35 and 36 parallel to the radial axis 15, enabling the tool holder and tool 37 to be mounted. On the inner surface 32 of the slide 3, facing the cavity of the hollow cylindrical body, are mounted radially two radial racks 38 and 39 identical with the racks 29 and 30 of the part 2. These radial racks are contiguous and located on both sides of the radial axis of symmetry of the inner surface 32 of the slide 3, whereas the longitudinal racks 29 and 30 of the part 2 are located on the longitudinal edges of the flat surface 38 of the sliding carriage 27 of the central part 2, so that they are spaced from one another by a width equal at least to that of the two radial racks 38 and 39.

On the other hand, the two radial racks are arranged on two parts mounted slidably independent of one another on the slide 3 in the radial direction of movement of the latter and over a distance corresponding, in one direction or the other, to the take-up of the play of the transmission train. Each part 38, 39 is connected to the slide by a screw and nut adjusting system 43, 44 which enables the relative radial positions of the racks 38 and 39 to be adjusted.

The longitudinal racks 29 and 30 of the central part 2 are connected kinematically to the radial racks 38 and 39 of the slide 3 by two pairs of pinions: one pair of identical thick pinions 40 and 41 rotating around a first transverse axle 24 and a pair of identical thin pinions 40' and 41' rotating around a second transverse axle 24'. These pinions are of the same diameter and with straight teeth compatible with the teeth of the racks 29, 30, 38, 39. The width of each of the thick pinions 40 and 41 is substantially double the width of one of the longitudinal racks 29 and 30. These thick pinions 40 and 41 are mounted with needle bearings 5 and 6 on the first transverse spindle 24 which is force-fitted in the bores 22 and 23 of the body 1, and held by circlips 9 and 10. The thick pinions 40 and 41 are contiguous and cover almost the whole of the transverse spindle 24. Their teeth mesh in the longitudinal racks 29 and 30 of the sliding carriage 27.

The width of each of the thin pinions 40' 41' is substantially equal to that of the radial racks 38 and 39. The thin pinions 40' 41' are mounted with needle bearings 5' 6' on the second transverse axle 24' which is force-fitted in the bores 22' 23' of the body 1 and stopped by circlips 9' and 10'. The thin pinions 40' and 41' are contiguous and located at the middle of the second transverse axle 24', so that they face the radial racks 38 39 and mesh with them.

In addition, the separation of the transverse axles 24 and 24' is calculated so that the two pairs of thick and thin pinions mesh together, respectively the thick pinion 40 with the thin pinion 40' and the the thick pinion 41 with the thin pinion 41'.

The surfacing plate is fixed by screws to the milling spindle 21, and can hence be rotated when the latter rotates around its longitudinal axis 8. The conical end piece of the part 2 is connected longitudinally to the boring spindle 42 so as to follow the longitudinal movements thereof along the axis 8. In the surfacing plate according to the invention, the longitudinal movement of the boring spindle 42 in the milling spindle 21 results in the radial movement of the tool holder slide 3.

In fact, when the boring spindle 42 is moved longitudinally in the milling spindle 21, for example to the right in FIGS. 2 and 3, it drives the central part 2 by its movement through the conical end piece 26. Since the cylindrical body 1 remains longitudinally fixed with respect to the milling spindle 21 to which it is fastened, the central part 2 will slide longitudinally to the right within the body 1. The longitudinal racks 29 and 30 will be moved longitudinally to the right. These longitudinal racks will rotate at the thick pinions 41 and 40 whose axes are on the longitudinally fixed body 1, in counter-clockwise direction for the example selected. The thick pinions 40 and 41, which mesh with the thin pinions 40' and 41' drive the latter in rotation in clockwise direction in the example chosen. These thin pinions 41' and 40', which mesh with the radial racks 39 and 38 of the slide 3 will cause these racks, and hence the slide 3, to move radially downward in FIG. 2 in the example chosen. Thus, the axial movement of the boring spindle 42 is converted into a radial movement of the slide 3.

In a preferred embodiment of the invention, the various pinions and racks are selected so that, to a given longitudinal travel of the central part 2 (and hence of the boring spindle 42), there corresponds the same radial travel of the slide 3, In other words, the axial forward movement of the boring spindle 42 is transmitted into a radial movement of the slide 3 in the ratio 1:1.

On the other hand, the width and the relative positions of the longitudinal racks 29 and 30 and of the thin pinions 40' and 41' enable the sliding carriage 27 to slide up to its stop against the slide 3 without the risk of longitudinal racks 29 and 30 coming into engagement with the thin pinions 40' and 41'. This feature enables the compactness of the surfacing plate according to the invention.

Because of the simplicity of the constituent elements of the surfacing plate, these can very easily be centered on the longitudinal rotary axis 8. The pinions 40, 41, 40', 41', on the one hand, the carriage holder 27, on the other hand, are located on each side of this rotary axis, so that the center of inertia of the rotary masses coincides substantially with a point of the rotary axis which enables high rotary speeds to be achieved without risk. The simplicity and the small number of constituent members of the surfacing plate according to the invention assure accurate kinematic transmission the play of which can be taken up by regulating the relative axial position of the radial racks 38 and 39.

It is in fact possible to effect an opposite adjustment enabling play to be taken up in each direction of the axial movement of the boring spindle 42. In this way immediate and accurate response of the slide is obtained to the changes in direction of the boring spindle.

The surfacing plate according to the invention, associated with a boring and milling machine the axial movements of which (longitudinal movement of the boring spindle 42 with respect to the milling spindle 21 and relative longitudinal movement with respect to the table) are simultaneously servo-coupled, in programmed manner, enable working with linear or circular turning of the parts fixed to the table, and the production of varied bores and profiles.

We claim:

1. Surfacing plate for a boring and milling machine comprising a boring spindle rotatable and slidable longitudinally in a milling spindle, said plate comprising a hollow cylindrical body having a rear end fixed to the milling spindle and a front head on which a radial guide is formed for a tool holder slide the radial movement of which is controlled by the boring spindle through a mechanical control unit located inside said cylindrical body and comprising two longitudinal racks arranged on a central part sliding longitudinally inside said body under the action of said boring spindle and two radial racks fast to said tool holder slide and connected kinematically and independently to said two longitudinal racks, respectively, through two independent transmission trains, said two radial racks being arranged on two independent parts slidably mounted on said slide in the radial direction and each independently connected to said slide by an adjusting system for the opposite adjustment of the relative radial position of said two radial racks, so as to take up the slack in the kinematic transmission in each direction of the axial movement of said boring spindle.

2. Surfacing plate according to claim 1, wherein said two longitudinal racks, said two radial racks and said two transmission trains are located symmetrically on each side of an axial plane for said boring spindle parallel with said slide, so that the center of inertia of the whole is located substantially on the longitudinal rotary axis, said two transmission trains each being constituted by two pinions engaging, on the one hand, with one another and, on the other hand, one in the corresponding longitudinal rack and the other in the corresponding radial rack, and said pinions are loose-mounted in pairs on two axles perpendicular to the plane of symmetry and supported by the cylindrical body of said plate.

3. Surfacing plate according to claim 2, wherein said two longitudinal racks are separated by a distance equal to the total thickness of the pair of pinions engaging with said two radial racks, and each pinion engaging with said longitudinal racks has a width at least equal to the sum of the widths of the rack and of the other pinion of said transmission train with which it engages, said two longitudinal racks being slidable up to a stop against said slide by passing on each side of said pinions.

4. Surfacing plate according to any one of claims 1 or 2, wherein said means for adjusting the relative position of said two radial racks are constituted by two screw-nut systems each supported on the one hand on said slide and on the other hand on the corresponding radial rack, the latter being formed on a part mounted to slide radially on said slide over a length corresponding, in one direction or the other, to the taking up of the slack in said transmission train.

* * * * *

UNITED STATES PATENT AND TRADEMARK OFFICE
CERTIFICATE OF CORRECTION

PATENT NO. : 4,411,177

DATED : October 25, 1983

INVENTOR(S) : Batistoni

It is certified that error appears in the above-identified patent and that said Letters Patent is hereby corrected as shown below:

On the title page, Item [73],
Please correct the assignee's name to read --FRAMATOME--.

Signed and Sealed this

Twenty-fourth Day of July 1984

[SEAL]

Attest:

GERALD J. MOSSINGHOFF

Attesting Officer

Commissioner of Patents and Trademarks